US006943512B2

(12) United States Patent
Kobayashi

(10) Patent No.: US 6,943,512 B2
(45) Date of Patent: Sep. 13, 2005

(54) CONTROL APPARATUS FOR ELECTRIC POWER STEERING SYSTEM

(75) Inventor: Hideyuki Kobayashi, Gunma (JP)

(73) Assignee: NSK Ltd., Tokyo (JP)

( * ) Notice: Subject to any disclaimer, the term of this patent is extended or adjusted under 35 U.S.C. 154(b) by 169 days.

(21) Appl. No.: 10/351,582

(22) Filed: Jan. 27, 2003

(65) Prior Publication Data

US 2004/0056614 A1 Mar. 25, 2004

(30) Foreign Application Priority Data

Feb. 4, 2002 (JP) ....................................... 2002-026233

(51) Int. Cl.[7] ................................................. H02P 7/00

(52) U.S. Cl. ........................ 318/432; 318/430; 318/434; 318/700; 180/65.1; 180/65.8; 701/41; 701/44

(58) Field of Search ................................ 318/430–434, 318/700–800; 180/6.2–65.8; 701/41, 44

(56) References Cited

U.S. PATENT DOCUMENTS

| | | | | | |
|---|---|---|---|---|---|
| 4,476,954 | A | * | 10/1984 | Johnson et al. | 180/333 |
| 4,527,653 | A | * | 7/1985 | Agarwal et al. | 180/446 |
| 4,926,333 | A | * | 5/1990 | Hashiguchi et al. | 701/83 |
| 5,596,252 | A | * | 1/1997 | Shimizu et al. | 318/432 |
| 5,648,903 | A | * | 7/1997 | Liubakka | 701/41 |
| 5,740,040 | A | * | 4/1998 | Kifuku et al. | 701/41 |
| 5,919,241 | A | * | 7/1999 | Bolourchi et al. | 701/41 |
| 6,016,042 | A | * | 1/2000 | Miura et al. | 318/430 |
| 6,134,490 | A | * | 10/2000 | Ito et al. | 701/42 |
| 6,148,948 | A | * | 11/2000 | Shimizu et al. | 180/446 |
| 6,308,123 | B1 | * | 10/2001 | Ikegaya et al. | 701/41 |
| 6,407,524 | B1 | * | 6/2002 | Endo et al. | 318/432 |
| 6,580,988 | B2 | * | 6/2003 | Lin et al. | 701/41 |
| 6,687,589 | B2 | * | 2/2004 | Kanda | 701/41 |

FOREIGN PATENT DOCUMENTS

| | | | | |
|---|---|---|---|---|
| EP | 1332944 A2 | * | 2/2004 | B62D/5/04 |
| JP | 10-329745 | * | 12/1998 | B62D/6/00 |
| JP | 11-034902 | * | 2/1999 | B62D/6/00 |
| JP | 2002-193130 A | | 7/2002 | |
| JP | 2002-308136 | * | 10/2002 | B62D/6/00 |
| WO | WO03/066415 | * | 8/2003 | B62D/6/00 |
| WO | WO 03/066415 | * | 8/2004 | B62D/6/00 |

* cited by examiner

*Primary Examiner*—Marlon T. Fletcher
*Assistant Examiner*—Tyrone Smith
(74) *Attorney, Agent, or Firm*—Sughrue Mion, PLLC

(57) ABSTRACT

The present invention is a control apparatus for controlling an electric power steering system having steering assist force control means for controlling a motor that gives a steering assist force to a steering mechanism relying upon a main torque input value obtained by subjecting a main torque signal from a torque sensor to the A/D conversion, upon a gain-multiplied torque input value obtained by multiplying said main torque signal by a first gain times followed by the A/D conversion and upon a sub-torque signal from said torque sensor, in order to carry out a failsafe function, characterized by the provision of a gain multiplier for multiplying said main torque input value by a second gain times,. and switching means for changing the output of said gain multiplier and said gain-multiplied torque input value over to each other to input it to said steering assist force control means.

11 Claims, 8 Drawing Sheets

FIG. 3A
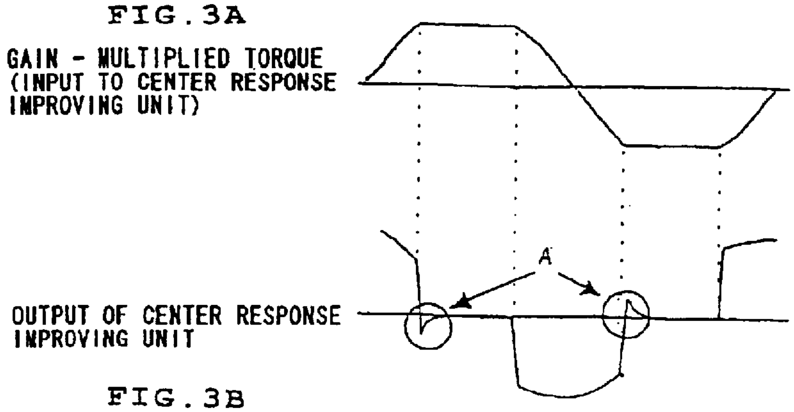
FIG. 3B
PRIOR ART
FIG. 4A
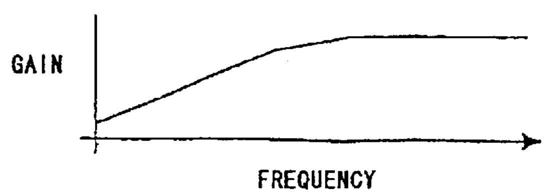
FIG. 4B
PRIOR ART
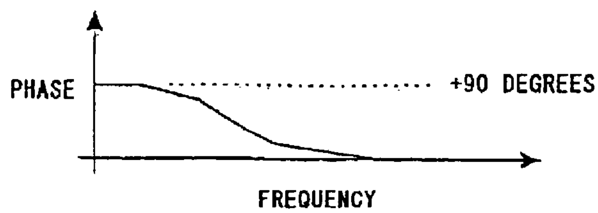
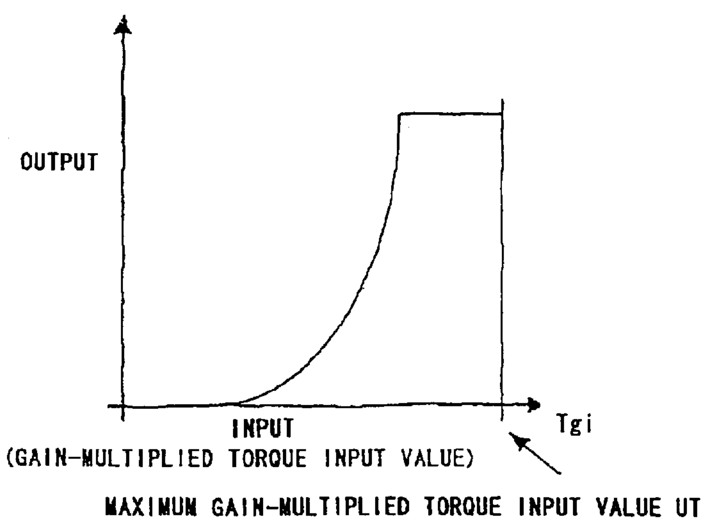
FIG. 5
PRIOR ART

GAIN-MULTIPLIED TORQUE

OUTPUT OF STEERING ASSIST COMMAND OPERATION UNIT

OUTPUT OF CENTER RESPONSE IMPROVING UNIT
B1
B2

OUTPUT OF STEERING ASSIST COMMAND OPERATION UNIT + OUTPUT OF CENTER RESPONSE IMPROVING UNIT
t1

CONTROL APPARATUS FOR ELECTRIC POWER STEERING SYSTEM

BACKGROUND OF THE INVENTION

1. Field of the Invention

The present invention relates to a control apparatus for controlling an electric power steering system that imparts an assist force produced by a motor to the steering system of cars or vehicles. More particularly, the present invention relates to a control apparatus for controlling an electric power steering system improving the feeling of steering of, particularly, when a steering wheel is sharply operated.

2. Description of the Related Art

In an electric power steering system which assists the load of the steering system of a car or a vehicle by utilizing the rotational force of a motor, the driving force of the motor is used for assisting the load of a steering shaft or a rack shaft through reduction gears and a transmission mechanism such as gears or a belt. In order to precisely produce an assist torque(steering assist torque), the conventional electric power steering system controls a motor current by feedback. The feedback control is to so adjust the voltage applied to the motor that a difference decreases between the current control value and the detected motor current. The voltage applied to the motor is usually adjusted relying upon a PWM(pulse width modulation)-controlled duty ratio.

Here, a general constitution of the electric power steering system will be described with reference to FIG. 1. A shaft 2 of a steering wheel 1 is coupled to tie rods 6 of the wheels through reduction gears 3, universal joints 4*a* and 4*b* and a pinion-rack mechanism 5. The shaft 2 is provided with a torque sensor 10 for detecting the steering torque. A motor 20 is coupled to the shaft 2 via the reduction gears 3 to assist the steering force of the steering wheel 1. An electric power is supplied from a battery 14, through an ignition key 11 and a relay 13, to a control unit 30 that controls the power steering system. The control unit 30 operates a steering assist command value I for an assist command based on a steering torque T(main torque signal Tm, sub-torque signal Ts) detected by the torque sensor 10, on a vehicle speed V detected by the vehicle speed sensor 12, and controls the electric current supplied to the motor 20 based on the steering assist command value I that is operated.

The above electric power steering system is provided with a torque sensor 10 that detects the steering torque to give, to the motor 20, the steering assist force corresponding to the steering torque transmitted from the steering shaft. To realize the failsafe function, the torque sensor 10 has two input systems to the control unit 30, i.e., a main system and a sub-system, and uses the main torque signal Tm for the steering assist control and uses the sub-torque signal Ts for the failsafe function. Though the steering assist control is carried out based on the main torque signal Tm, the assist control is generally realized by using an MCU (micro controller unit) and, hence, the main analog torque signal Tm must be converted into a digital value through an A/D conversion. However, an A/D converter has a limit on its resolution. In order to maximize the resolution of the A/D converter, therefore, the main torque signal Tm is multiplied (amplified) by a gain times in an analog manner, so that a range of the steering torque T that is usually used becomes a maximum input to the A/D converter. That is, a maximum expected steering torque T is adjusted by being multiplied by the gain times so as to be corresponded to a maximum value of the A/D converter.

FIG. 2 is a block diagram illustrating tie constitution of the control unit 30 of when the signals of the torque sensor 10 are to be controlled through the main and sub two systems. A main torque signal Tm from the torque sensor 10 is inputted to an A/D converter 321 and is further inputted to an A/D converter 322 through an(analog type) gain multiplier(amplifier) 31. A sub-torque signal Ts from the torque sensor 10 is inputted to an A/D converter 323 and an output of which is used for a separate failsafe function.

A main digital torque input value Tgr from the A/D converter 321, too, is used for the failsafe function. A gain-multiplied main torque input signal Tgi from the A/D converter 322 is inputted to a steering assist command operation unit 325 and to a center response improving unit 324, and is used for the failsafe function.

The outputs of the center response improving unit 324 and of the steering assist command operation unit 325 are added up together through an adder 32A, the added result is inputted to a current control unit 201 through a robust stabilization compensation unit 326, an adder 32B and an adder/subtractor 32C, and the motor 20 is driven with a current control value. A motor terminal voltage Vm and a motor current "i" are inputted to a motor angular velocity estimating unit 329, and an estimated angular velocity ω is inputted to a motor inertia compensation unit 328 and to a convergence control unit 327. The output of the convergence control unit 327 is inputted to the adder 32A and is added up, and the output of the motor inertia compensation unit 328 is inputted to the adder 32B and is added up.

The block 30 forms a control unit, and the block 32 forms an MCU control block. That is, the control unit 30 is constituted by the MCU control block 32 and the gain multiplier 31.

The center response improving unit 324 is to enhance the response characteristics of control near the neutral position of steering and to realize a smooth steering. Namely, this is to improve the response characteristics in the assist torque and to improve stability in the torque control system as has been described in, for example, Japanese Patent Application Laid-open No. 2001-328553 A filed by the present applicant. In order to improve the response characteristics in the control system, a value in proportion to the differentiation of the steering torque signal is added to the assist quantity (steering assist command value) while varying the differential gain depending upon the steering torque and the vehicle speed. By continuously changing the differential gain as described above, the steering feeling is prevented from becoming unnatural since there is no great change in the differential gain when the steering torque, vehicle speed or steering pattern has changed and, thus, a comfortable steering performance is obtained. Upon increasing the differential gain in a region where the steering torque is small, further, the response characteristics are enhanced near the neutral point to obtain small hysteresis characteristics, to obtain comfortable steering performance, and to maintain response performance and stability in a region of large steering torque.

In order to improve the convergence of yawing of the vehicle, the convergence control unit 327 applies the brake to the swinging motion of the steering wheel, and the motor inertia compensation unit 328 compensates the inertia and friction of the motor 20. The robust stabilization compensation unit 326 is the one that has been taught in Japanese Patent Application Laid-open No. 8-290778 A, has a characteristic equation $G(s)=(s^2+a1\cdot s+a2)/(s^2+b1\cdot s+b2)$ using "s" as the Laplace operator, removes a peak value of resonance frequency in the resonance system constituted by an inertia element and a spring element included in the detected torque, and compensates for a deviation in the phase of the resonance frequency that impairs the stability and response characteristics of the control system. Symbols "a1, a2, b1 and b2" in the characteristic equation G(s) respectively denote parameters determined by resonance frequencies in the resonance system.

The motor angular velocity estimating unit 329 may estimate the angular velocity by a method disclosed in Japanese Patent Application Laid-open No. 10-109655 A or may estimate the angular velocity in a manner as taught in Japanese Patent Application No. 10-338152 A filed by the present applicant.

In the above control apparatus, when the steering wheel is sharply steered, the main torque signal Tm from the torque sensor 10 becomes excessively great, and the torque signal Tgo after multiplied by the gain through the gain multiplier 31 may exceed the input range(full-scale) of the A/D converter 322, whereby a value to be put to the A/D conversion is clamped to a maximum value of the A/D converter. When a gain-multiplied torque input value Tgi shown in FIG. 3A is inputted to the center response improving unit 324, there is obtained a waveform shown in FIG. 3B since the center response improving unit 324 is constituted by a differential element as described above. When the gain-multiplied torque input value Tgi is saturated, therefore, the waveform becomes as shown in FIG. 3B. There exists a differential waveform which works to temporarily decrease the current command value as surrounded by a circle and designated at "A", deteriorating the feeling of steering. The occurrence of this problem will be described below in further detail.

The center response improving unit 324 has gain-frequency characteristics as shown in FIG. 4A and approximate differential characteristics with phase-frequency characteristics as shown in FIG. 4B. The steering assist command operation unit 325, on the other hand, has input/output characteristics of gain-multiplied torque input value (Tgi) vs output as shown in, for example, FIG. 5.

Here, when the steering wheel is sharply steered as described above, the torque sensor 10 produces a large main torque signal Tm and a large sub-torque signal Ts, and the gain-multiplied signal that is multiplied by the gain through the gain multiplier 31 may exceed the full-scale of the A/D converter 322 (time point t1 in FIGS. 6A to 6D). In such a case, the gain-multiplied torque input value Tgi outputted from the A/D converter 322 becomes as shown in FIG. 6A, the output of the steering assist command operation unit 325 becomes as shown in FIG. 6B, and the out of the center response improving unit 324 becomes as shown in FIG. 6C. Further, the output waveform of the "center response improving unit 324+ steering assist command operation unit 325" becomes as shown in FIG. 6D which is the addition of the waveform of FIG. 6B and the waveform of FIG. 6C.

The gain-multiplied torque input value Tgi at the time point t1 is limited to a maximum value of the A/D converter 322, whereby a pulse-like differential waveform appears on the output of the center response improving unit 324 (portion "A" in FIG. 3B and portion "B1" in FIG. 6C) thereby to decrease the output "output of the center response improving unit 324+ output of the steering assist command operation unit 325" (portion "B2" in FIG. 6D). Therefore, the assist torque fluctuates with a large steering input to deteriorate the feeling of steering.

Further, when the gain-multiplied torque input value is received in excess of the resolution of the A/D converter, the steering assist force is not quite controlled for the greater steering torque, often causing offensive feeling such as fluctuation in the steering torque.

SUMMARY OF THE INVENTION

The present invention was accomplished in view of the above-mentioned circumstances and has an object of providing a control apparatus for controlling an electric power steering system which does not deteriorate the feeling of steering even in case a signal of a torque sensor exceeds the resolution of an A/D converter at the time of sharp steering.

The present invention is concerned with an electric power steering system having a steering assist force control means for controlling a motor that gives a steering assist force to a steering mechanism relying upon a main torque input value obtained by subjecting a main torque signal from a torque sensor to the A/D conversion, upon a gain-multiplied torque input value obtained by multiplying said main torque signal by a first gain times followed by the A/D conversion and upon a sub-torque value from said torque sensor, in order to carry out a failsafe function. The above object of the present invention is accomplished by the provision of a gain multiplier for multiplying said main torque input value by a second gain times, and switching means for changing the output of said gain multiplier and said gain-multiplied torque input value over to each other to input it to said steering assist force control means.

When said main torque signal exceeds the input range of a control unit, said main torque input value is multiplied by said gain multiplier to be the same as by said first gain times through said switching means and is inputted to said steering assist force control means, and said gain multiplier and said switching means are realized by software functions in order to more effectively accomplish the above object.

BRIEF DESCRIPTION OF THE DRAWINGS

In the accompanying drawings:

FIGS. 3A and 3B are waveform diagrams illustrating input and output waveforms of a center response improving unit;

FIGS. 4A and 4B are diagrams illustrating the characteristics of the center response improving unit;

FIG. 5 is a diagram illustrating the characteristics of the steer assist instruction operation unit;

DESCRIPTION OF THE PREFERRED EMBODIMENTS

Even in case a gain-multiplied torque input value is in excess of the MCU input value, i.e., in excess of the resolution of the A/D converter-according to the present invention, the steering torque differentiation means performs the calculation based upon the main torque input value without the need of using the saturated gain-multiplied torque input values. That is, the center response improving unit produces no pulse-like output. Therefore, the output of the current command value does not decrease, and the feeling of steering is not deteriorated.

Further, even when the gain-multiplied torque input value is in excess of the resolution of the A/D converter, the steering assist force control means works due to the main torque input value. It is therefore allowed to continue the steering assist force control irrespective of the saturation in the gain-multiplied torque input value.

An embodiment of the invention will now be described with reference to the drawings.

Figure 1:
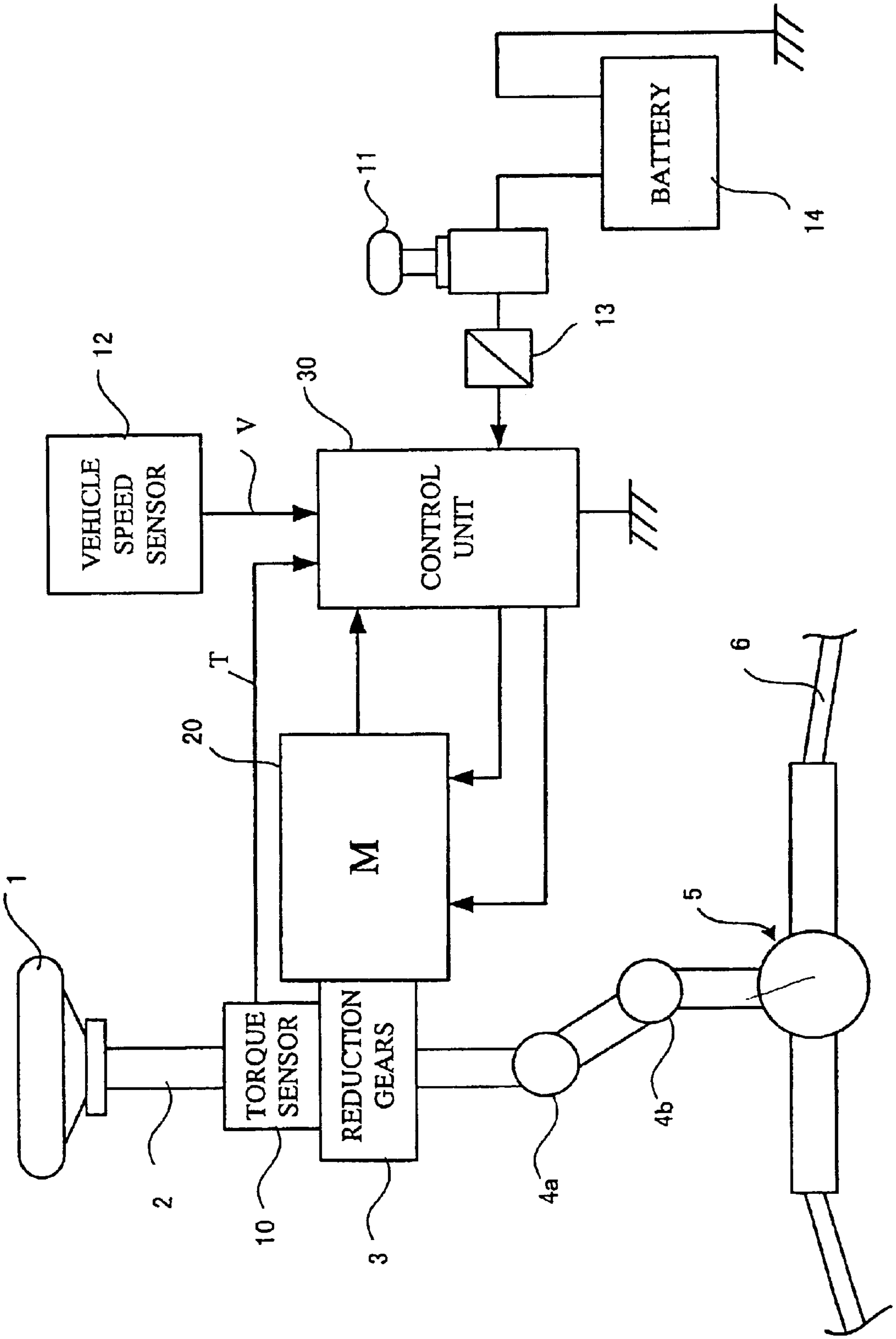
FIG. 1 is a diagram of mechanism illustrating a general constitution of a conventional electric power steering system.
Figure 2:
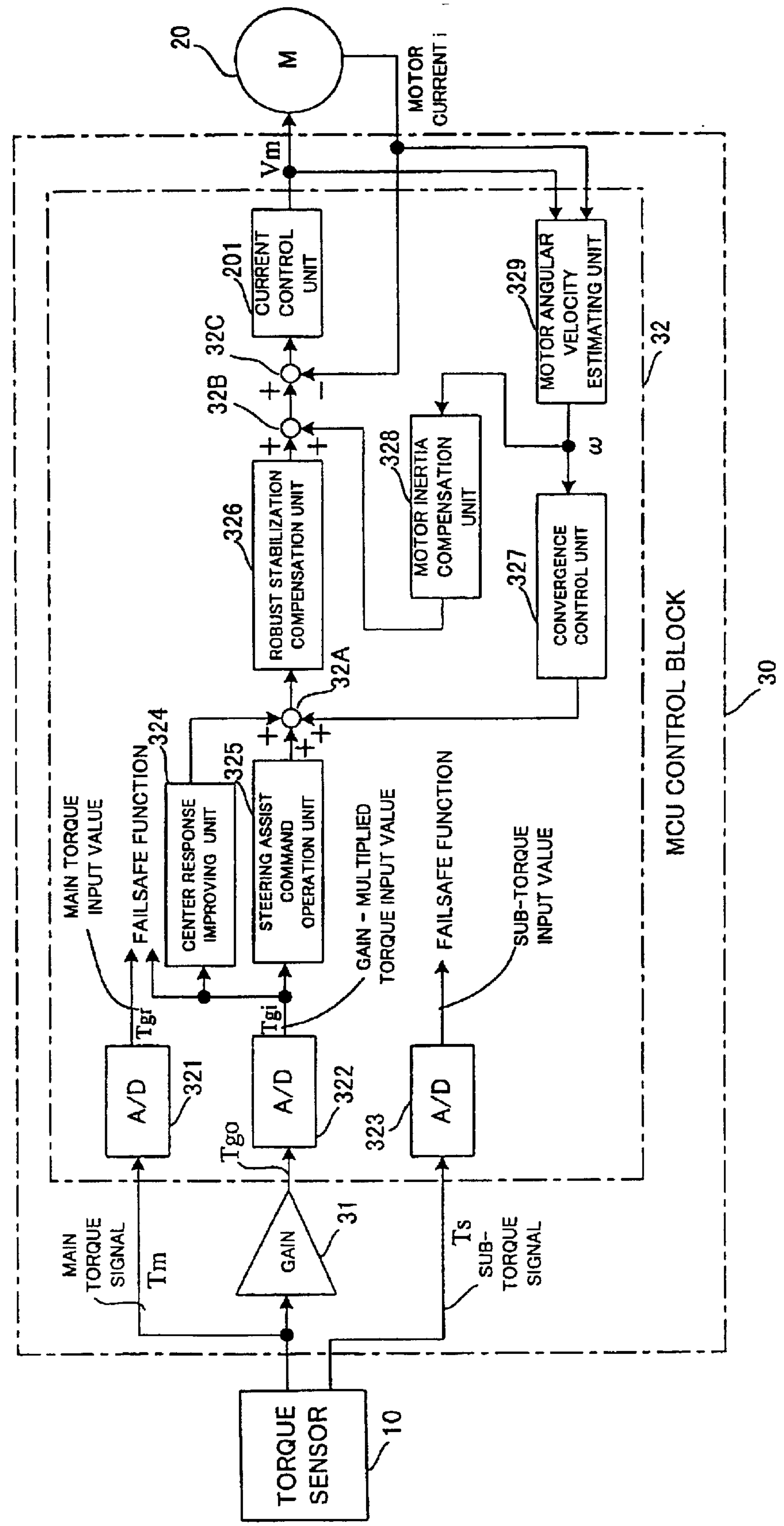
FIG. 2 is a block diagram illustrating the constitution of a conventional control apparatus for controlling an electric power steering system.
Figures 6A, 6B, 6C, 6D:
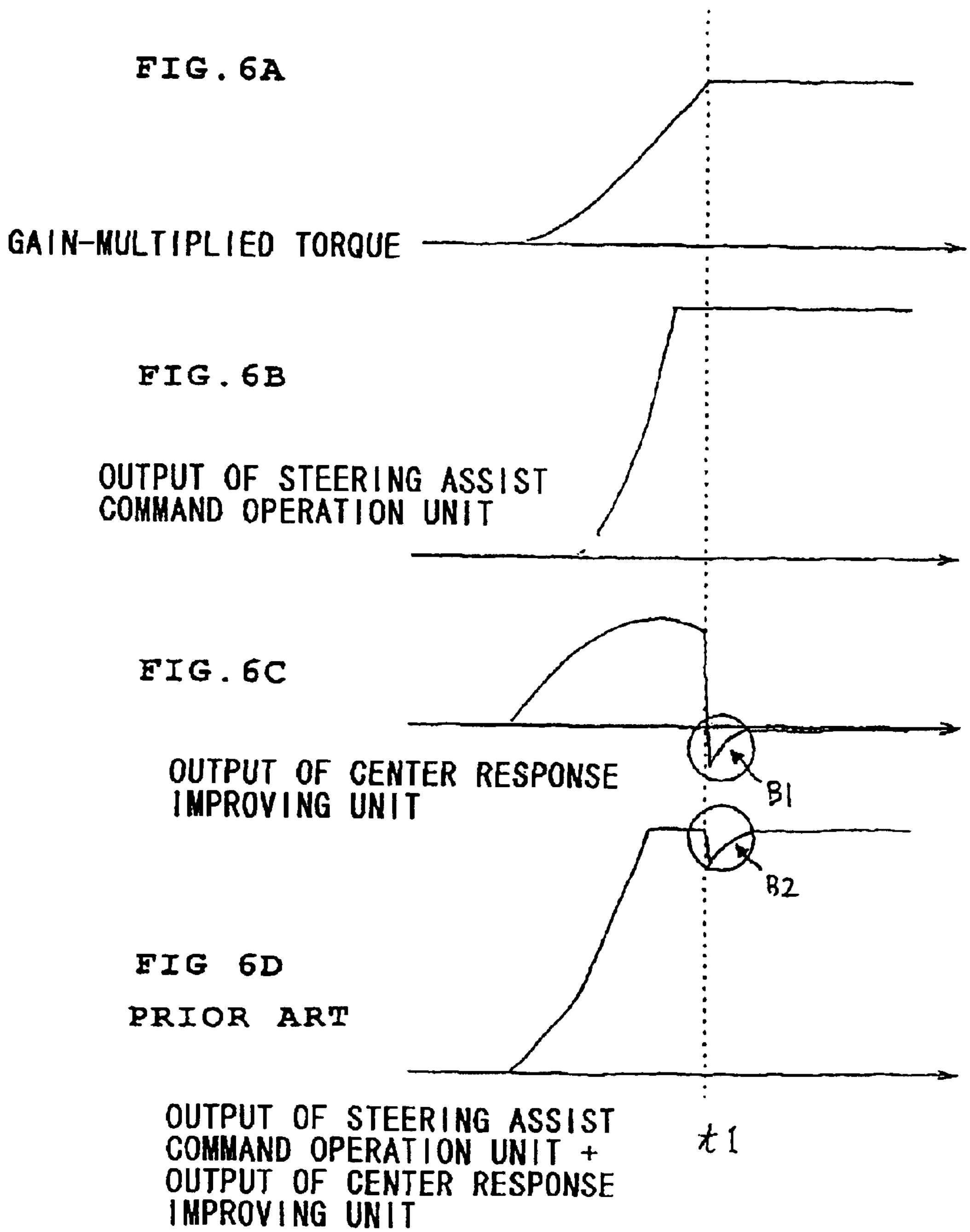
FIGS. 6A to 6D are waveform diagrams illustrating the operation waveforms at each of the portions of the conventional apparatus for controlling the electric power steering system.

The constitution of the control apparatus for controlling an electric power steering system according to the present invention shown in FIG. 7 will be described with reference also to FIG. 2. The present invention is provided with a switching means 303 for changing the main torque input value Tgr from the A/D converter 321 and the gain-multiplied torque input value Tgi from the A/D converter 322 over to each other under predetermined conditions, and with a steering assist force control means 300 that is operated by the output of the switching mans 303.

Figure 7:
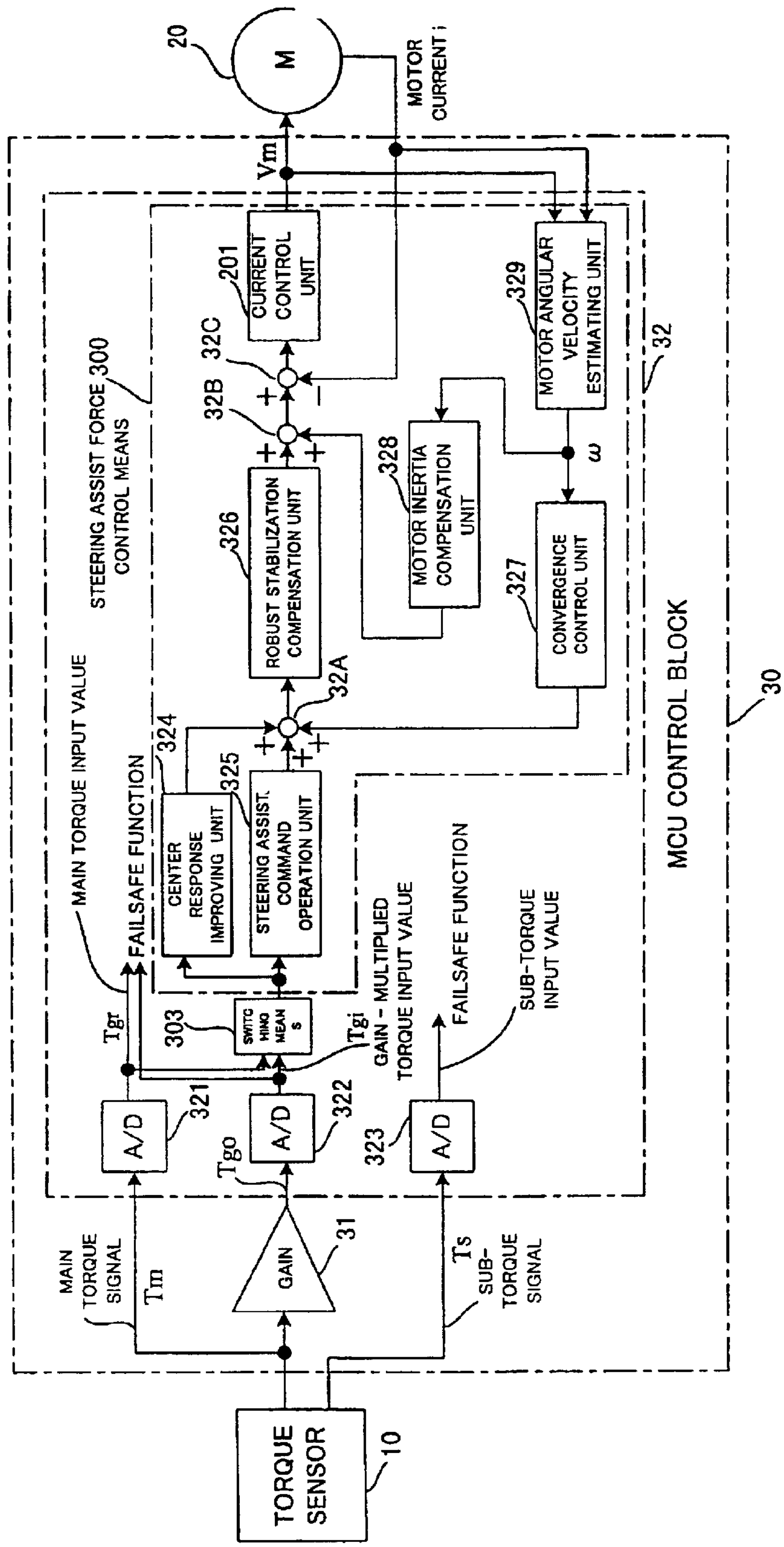
FIG. 7 is a block diagram illustrating the constitution of a control apparatus for controlling an electric power steering system according to the present invention.
Figure 8:
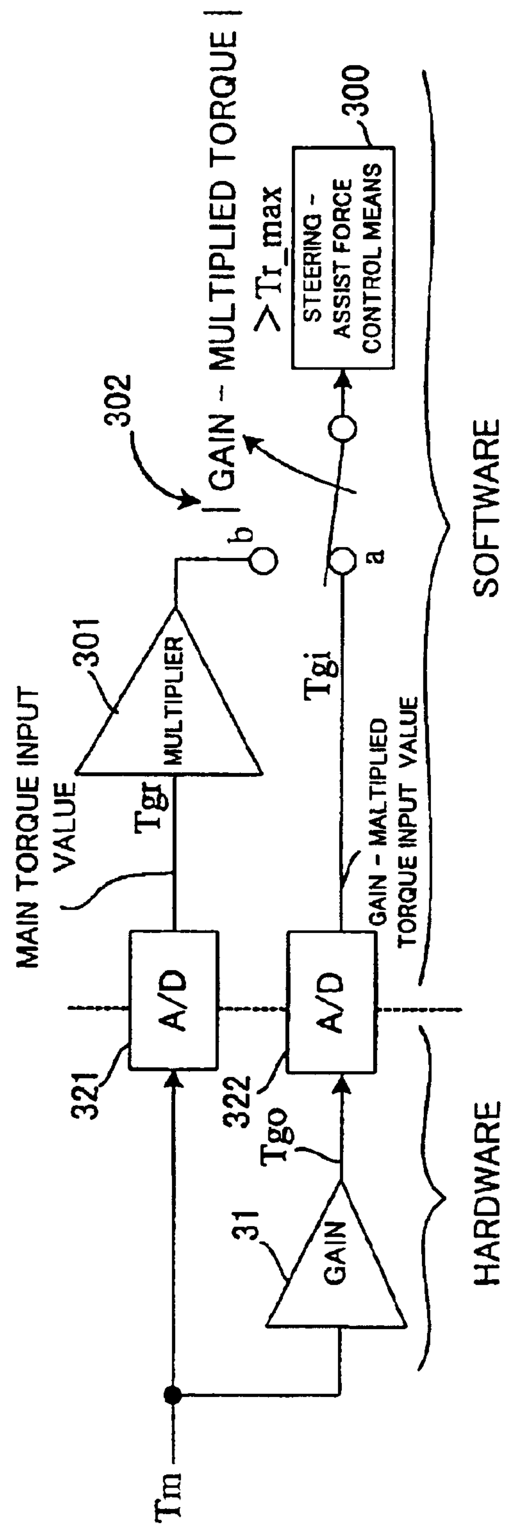
FIG. 8 is a block diagram illustrating the constitution of major portions of the control apparatus according to the present invention.

FIG. 8 is a block diagram illustrating major portions (switching means 303, steering assist force control means 300) of FIG. 7. The control apparatus of this embodiment is provided with a (digital type) gain multiplier 301 for multiplying, by a gain times, the main torque input value Tgr outputted from the A/D converter 321. Provision is further made of a switch 302 for connecting the output of the gain multiplier 301 to a contact "a" and for connecting the output of the A/D converter 322 to a contact "b", the output of the switch 302 being inputted to the steering assist force control means 300. The contact of the switch 302 is usually connected to the contact "a". When a signal in excess of the resolution is inputted to the A/D converter 322, this fact is detected and the connection is switched to the contact "b". Further, the gain multiplier 301, the switch 302 and the steering assist force control means 300 are constituted by softwares.

In the thus constituted control apparatus, the switch 302 is usually connected to the contact "a", and the gain-multiplied torque input value Tgi produced by the A/D converter 322 is inputted to the steering assist force control means 300. FIGS. 9A to 9D illustrate waveforms of each of the portions, which are the same as those of the prior art up to a time point t2 (refer to FIGS. 6A to 6D).

When the magnitude of the output Tgo of the gain multiplier 31 exceeds the resolution of the A/D converter 322 (time point t2) due to the sharp steering, i.e., when the output Tgo of the gain multiplier 31 exceeds the input range corresponding to a maximum value Tr_max of the A/D converter 322 (though there is provided, as a hardware, a protection circuit which inhibits the input of a voltage which greatly exceeds the input voltage range that can be subjected to the A/D conversion), this fact is detected by a detecting means and the contact of the switch 302 is changed from "a" over to "b". Then, the main torque input value Tgr which is the output of the A/D converter 321 is inputted to the gain multiplier 301 and is digitally multiplied by the same gain times as that of through the gain multiplier 31. The output of the gain multiplier 301 is inputted to the steering assist force control means 300 through the contact "b" of the switch 302.

Figure 9A:
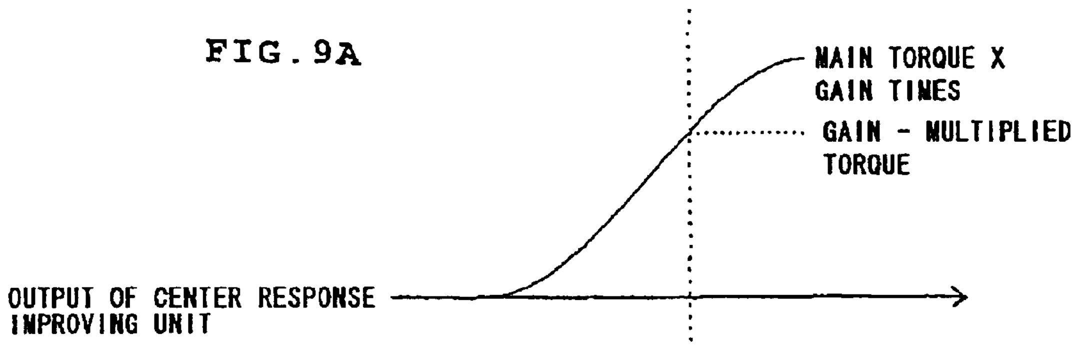
FIGS. 9A to 9D are waveform diagrams illustrating waveforms at each of the portions of the control apparatus according to the present invention.
Figure 9B:
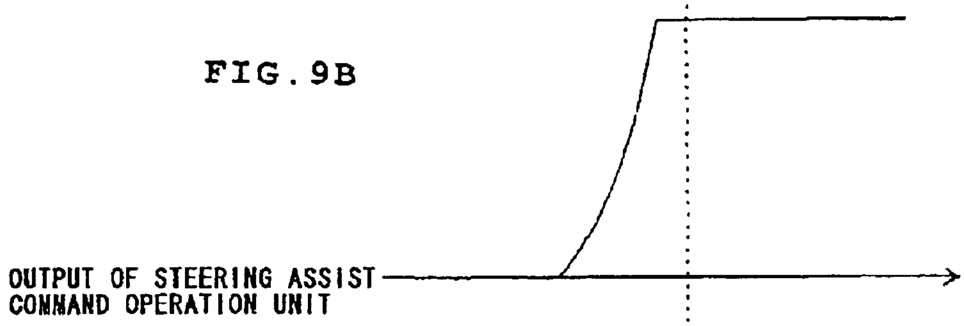
Figure 9C:
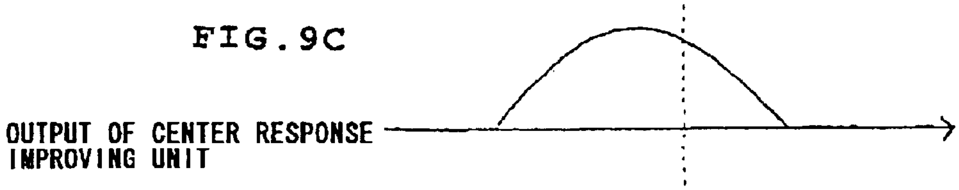
Figure 9D:
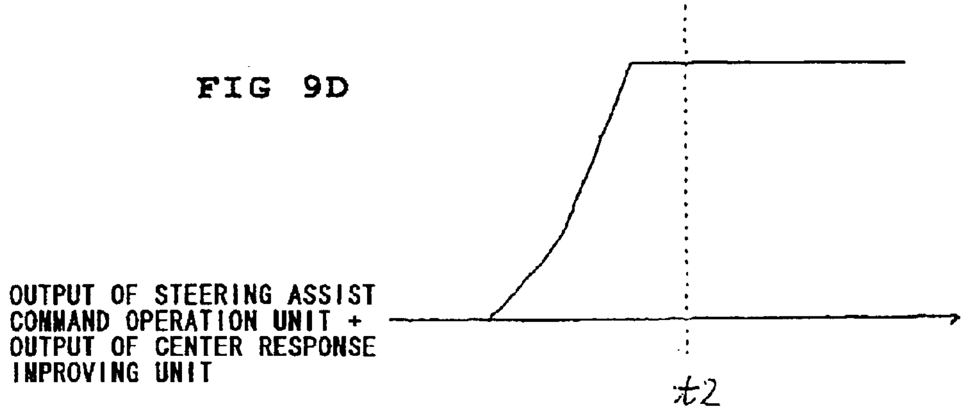

After the time point t2 as described above, the output is multiplied by the gain times through the gain multiplier 301. Upon changing the switch 302 to the contact "b", the output of the gain 301 gradually increases, i.e., the input to the steering assist force control means 300 gradually increases as shown in FIG. 9A. As a result, the output waveform of the center response improving unit 324 becomes as shown in FIG. 9C and the output of the steering assist command operation unit 325 remains the same as that of the prior art as shown in FIG. 9B. Accordingly, "the output of the steering assist command operation unit 325+ the output of the center response improving unit 324" become as shown in FIG. 9D without any decrease in the output at the portion "B2" that occurred in the prior art.

According to the above control apparatus, the gain-multiplied torque input value Tgi is not saturated or the saturated signal is not differentiated as shown in FIG. 9A. As shown in FIG. 9C, therefore, the output of the center response improving portion 324 does not contain the pulse-like wave that was described above. As a result, "the output of the steering assist command operation unit 325+ the output of the center response improving unit 324" contain no waveform that decreases the output as shown in FIG. 9D, and the feeling of steering is not impaired.

Figure 10:
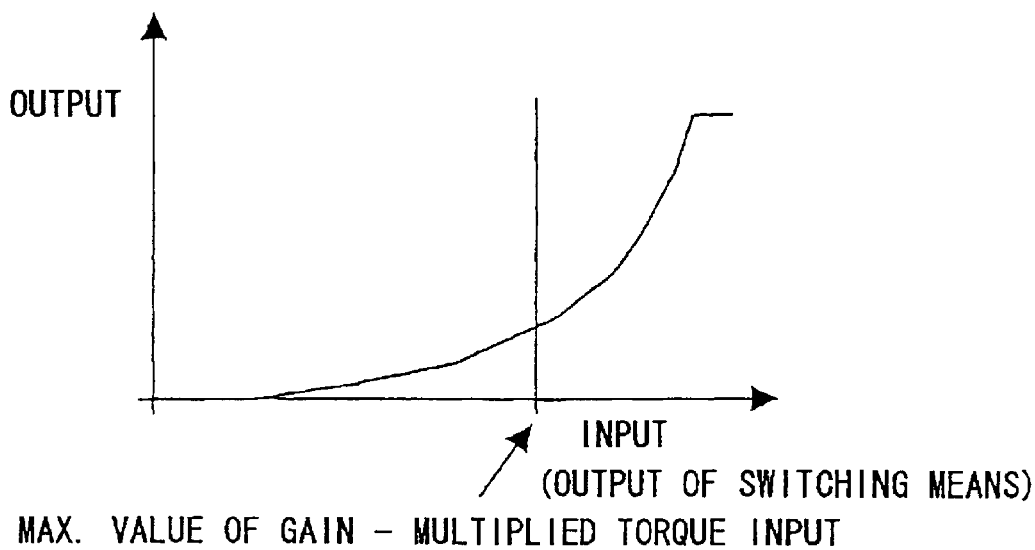
FIG. 10 is a diagram illustrating an example of setting a steer assist instruction operation unit.

Further, when the steering assist command operation unit 325 is set as shown in FIG. 10, the steering assist force can be controlled by using the main torque input value Tgr that has passed through the gain multiplier 301 even in case the gain-multiplied torque input value Tgi exceeds the input range, and the feeling of steering is not deteriorated.

When constituted by a software, the switch 302 includes the operation for judging the input of the gain-multiplied torque input value and the main torque input value in addition to the switching function of the switch.

According to the present invention as described above, when the gain-multiplied main torque signal exceeds the input range of the A/D converter of the MCU like when the steering wheel is sharply steered, the hardware controls the steering assist force based on the main torque signal that has not been multiplied by the gain times, and the output of the steering torque differentiation means contains no pulse-like waveform. As a result, the feeling of steering is not deteriorated, which is a distinguished effect. Further, the steering assist command operation unit can be set maintaining an increased degree of freedom.

What is claimed is:

1. A control apparatus for an electric power steering system having a steering assist force control means for controlling a motor that gives a steering assist force to a steering mechanism relying upon a main torque input value obtained by subjecting a main torque signal from a torque sensor to an A/D conversion, upon a gain-multiplied torque input value obtained by multiplying said main torque signal by a first gain followed by the A/D conversion and upon a sub-torque value from said torque sensor, in order to carry out a failsafe function, characterized by the provision of a gain multiplier for multiplying said main torque input value by a second gain, and a switching means for changing the output of said gain multiplier and said gain-multiplied torque input value and for inputting it to said steering assist force control means.

2. A control apparatus for an electric power steering system according to claim 1, wherein when said main torque signal exceeds an input range of a control unit, said main torque input value is multiplied by said gain multiplier to be the same as by said first gain through said switching means and is inputted to said steering assist force control means.

3. A control apparatus for an electric power steering system according to claim 1, wherein said gain multiplier and said switching means are realized by software functions.

4. A control apparatus for an electric power steering system according to claim 2, wherein said gain multiplier and said switching means are realized by software functions.

5. A control apparatus for an electric power steering system according to claim 1, wherein said gain multiplier is a digital type.

6. A control apparatus for an electric power steering system according to claim 1, wherein said main torque input value is formed in a A/D converter and said gain-multiplied torque input value is formed in a second A/D converter.

7. A control apparatus for an electric power steering system according to claim 6, wherein an output of said gain multiplier does not exceed a rate input region of said second A/D converter.

8. A control apparatus for an electric power steering system, wherein a main torque input value obtained by A/D converting a main torque signal from a torque sensor is inputted to a center response improving unit, said main torque signal is gain-multiplied and then is A/D converted, the outputted gain-multiplied torque input value is inputted to a steering assist force command operation unit and said center response improving unit, a sub-torque signal from said torque sensor is A/D converted and then is utilized to a failsafe function, and a steering assist force is given to a steering mechanism based upon each output of said steering assist force command operation unit and said center response improving unit, characterized by the provision of a gain multiplier for multiplying said main torque input value by a second gains, and a switching means for changing the output of said gain multiplier and said gain-multiplied torque input value and for inputting it to said center response improving unit.

9. A control apparatus for an electric power steering system according to claim 8, wherein when said main torque signal exceeds an input range of a control unit, said main torque input value is multiplied by said gain multiplier to be the same as by said first gain through said switching means and is inputted to said center response improving unit.

10. A control apparatus for an electric power steering system comprising:

a steering assist force control means for controlling a motor that gives a steering assist force to a steering mechanism;

an A/D converter for receiving a main torque signal from a torque sensor;

a gain multiplier, connected to receive an output of said A/D converter, and configured to multiply said A/D converted main torque signal by a first gain;

an amplifier connected to receive said main torque signal from said torque sensor, and configured to multiply said main torque signal by a second gain;

a second A/D converter arranged to receive an output value from said amplifier; and a switching means, connected to receive output from said gain multiplier and from said second A/D converter, for switching an input to said steering assist force control means between the output of said second A/D converter and the output of said gain multiplier.

11. A control apparatus for an electric power steering system according to claim 10, further comprising an input for receiving a sub-torque value from said torque sensor, wherein said sub-torque input is connected to a failsafe function.

* * * * *